US008661404B2

(12) United States Patent
Goel et al.

(10) Patent No.: US 8,661,404 B2
(45) Date of Patent: Feb. 25, 2014

(54) METHOD FOR IMPROVING EXECUTION EFFICIENCY OF A SOFTWARE PACKAGE CUSTOMIZATION

(75) Inventors: Anirudh Goel, Karnataka (IN); Raghunandan Shrinivas Terdal, Karnataka (IN)

(73) Assignee: Infosys Limited, Karnataka (IN)

( * ) Notice: Subject to any disclaimer, the term of this patent is extended or adjusted under 35 U.S.C. 154(b) by 1199 days.

(21) Appl. No.: 12/503,618

(22) Filed: Jul. 15, 2009

(65) Prior Publication Data

US 2011/0016447 A1 Jan. 20, 2011

(51) Int. Cl.
*G06F 9/44* (2006.01)

(52) U.S. Cl.
USPC ............................. 717/101; 717/120; 717/123

(58) Field of Classification Search
USPC .......................................... 717/101, 120, 123
See application file for complete search history.

(56) References Cited

U.S. PATENT DOCUMENTS

| | | | |
|---|---|---|---|
| 7,069,204 B1 * | 6/2006 | Solden et al. .................... | 703/14 |
| 2001/0051913 A1 * | 12/2001 | Vashistha et al. ............... | 705/37 |
| 2004/0012634 A1 * | 1/2004 | Kraemer et al. ................ | 345/771 |
| 2004/0013250 A1 * | 1/2004 | Kotnur et al. ............ | 379/112.01 |
| 2007/0043525 A1 * | 2/2007 | Brown et al. .................... | 702/81 |
| 2007/0112763 A1 * | 5/2007 | Broder et al. ..................... | 707/5 |
| 2008/0284643 A1 * | 11/2008 | Scherzinger et al. .... | 342/357.02 |

OTHER PUBLICATIONS

Terrence P. Fries "A Framework for Transforming Structured Analysis and Design Artifacts to UML", ACM, Oct. 2006 p. 105-112.*
Levesque et al. "Estimating Software Size with UML Models" ACM, May 2008, p. 81-87.*
Pereira et al. "A Model for fast Web Mining Prototyping" ACM 2009, p. 114-123.*
Cortellessa et al. "Early reliability assessment of UML based software models" ACM Jul. 2002, p. 320309.*

* cited by examiner

*Primary Examiner* — Anna Deng
(74) *Attorney, Agent, or Firm* — Michael Best & Friedrich LLP

(57) ABSTRACT

A method for improving execution efficiency of a software package customization is disclosed. The method includes identifying one or more components from a configuration table to implement at least one of a use case flow or a non functional requirement (NFR) or an interface document or combinations thereof derived using an use case of the software project, sequencing the identified one or more components to prioritize execution of the use case of the software project and attributing complexity of the identified one or more components to determine the effort estimation for execution of the use case. Attributing complexity includes using an unit effort table for determining the effort estimation requirement for execution of each component of the use case. The method further includes identifying a usage type, attributing the reuse level and resolving the dependencies among the identified components.

21 Claims, 3 Drawing Sheets

METHOD FOR IMPROVING EXECUTION EFFICIENCY OF A SOFTWARE PACKAGE CUSTOMIZATION

BACKGROUND

The present invention is directed, in general, to the estimation, design and planning of software package customizations.

Effort estimation consists of predicting how many hours of work and how many workers are needed to develop a software project. The effort invested in a software project is probably one of the most important and most analyzed variables in recent years in the process of project management. The determination of the value of this variable when initiating software projects allows planning adequately any forthcoming activities. Estimating the amount of effort required to develop software from a requirements document is currently a human intensive activity and is inherently subjective.

Package implementation and customization is an evolution of software development wherein the systems integrator builds new functionalities or customizes the existing functionalities of a readymade solution to suit the customer's requirements. Packaged solution leads to risk reduction, introduction of best practices and processes, speed of implementation and reduction of total development cost.

Currently effort estimation for package implementation and customization is done by using existing techniques such as Function Point Estimation, SMC Estimation, and Use Case Point Estimation. The developed methodologies do not provide a mechanism to bridge the gap between what the package offers and what needs to be customized or built afresh. The developed methods also do not possess a structured methodology to provide inputs to associate the requirements-to-gaps identified and how these will be addressed during the design phase. As a result, these methodologies don't provide an accurate estimation of the package implementation or customization.

Standard estimation methodologies do not factor in customization to existing package capabilities and estimates from the build from scratch perspective. Also, the current estimation methodologies depend a lot on the project team's technical knowledge of the package being implemented while providing the effort estimation. Most of the current estimation methodologies were developed before the advent of package implementation or are best suited for Greenfield development and hence are not ideal for effort estimations specifically tailored to package implementation and customization. Also, the prior art estimation methodologies need the involvement of product vendors while carrying out the gap analysis.

The existing software development methodologies while carrying out the detailed design requires the developer to have deep product expertise to understand use case based requirements; analyze components provided by the off-the-shelf product and then develop design. Hence, any failure at this juncture can lead to higher effort, less utilization of out-of-the-box features and highly unmanageable and non-maintainable code. It's clearly evident that all the developers, who are assigned to design the Use cases, need to possess in depth knowledge of the package being implemented.

Project planning in package customizations is also crucial for best usage of expertise available in the project team. Predominantly, task allocation is done at a use case level and very often, synergies between a developer's skill set and expertise and the number and type of use cases allocated to the developer are not leveraged to the maximum extent possible. This leads to sub-optimal usage of expertise available within the project team. Accurate estimation of effort can lead to better project planning by matching the right developer with the right use cases in a Global Delivery Model context with teams working in different parts of the globe across different time zones.

In view of the foregoing, it has been found that conventional approaches to estimate the effort required for package implementation suffer from shortcomings and inefficiencies that warrant improvement. Accordingly, there is a need for a unique way to estimate the effort required for package implementations or package customizations by including special characteristics of package implementations which goes to the granular level of the components of a package.

BRIEF DESCRIPTION

A method for improving the execution efficiency of a software package customization is disclosed. The method includes identifying one or more components from a configuration table of component types to implement at least one of a use case flow or a non functional requirement (NFR) or an interface document or combinations thereof derived using an use case of the software project, sequencing the identified one or more components to prioritize execution of the use case of the software project and attributing complexity of the identified one or more components to determine the effort estimation for execution of the use case, wherein the attributing complexity includes using an unit effort table for determining the effort estimation requirement for execution of each component of the use case. The method further includes an effort guidelines table while attributing complexity of the identified components. The method further includes identifying a usage type, attributing the reuse level and resolving the dependencies among the identified components. The method also includes the step of mapping the identified components to a primary execution package and/or an additional package that is integrated to implement the complete functionality of the use case.

In one embodiment of the present invention, the usage type of the identified component is selected from the group which consists of build afresh, customization, out of box (OOB) or duplicate. The effort estimation required for customization or OOB of the identified components is a percentage indicative of the effort estimation required for build afresh type. The reuse level of the identified component is determined based on the availability of similar components in past use cases. The method also includes identifying the additional activities required for developing the identified components or the use case or the software project or combination thereof.

In another embodiment of the present invention, a method to perform the gap analysis post requirements gathering of a software project to act as a precursor for a detailed design of the software project is disclosed. The method includes the steps of:

a) identifying one or more components from a configuration table to implement at least one of a use case flow or a non functional requirement (NFR) or an interface document or combinations thereof derived using an use case of the software project;

b) sequencing the identified one or more components to prioritize execution of the use case of the software project;

c) attributing complexity of the identified one or more components to determine the effort estimation for execution of the use case, wherein the attributing complexity includes using an unit effort table for determining the effort estimation requirement for execution of each component of the use case; and d) generating at least one an implementation remark to the identified one or more components; and e) providing architecture notes to capture architecturally significant details about the identified one or more identified components wherein at least one of the steps a) or b) or c) or d) or e) or combinations thereof acts as the precursor for the detailed design of the software project.

In yet another embodiment of the present invention, the method of enhancing the efficiency of a project planning of a software project is disclosed. The method includes the steps of identifying one or more components and attributing component types to these components from a configuration table to implement at least one of a use case flow or a non functional requirement (NFR) or an interface document or combinations thereof derived using an use case of the software project, storing the identified one or more components in a component table of the software project, grouping one or more identified components from the component table of the software project and assigning at least one resource having an expertise to execute the grouped components.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein The present invention relates to a methodology for improving execution efficiency for software projects based on package implementations or package customizations.

As will be appreciated by people skilled in the art, to best understand the present invention it is important to be familiar with the environment in which it is used.

Package implementations are an evolution of the traditional software development scenario. Companies are moving to developing generic software platforms which can later be customized to specific client requirements. But the existing estimation methodologies still adhere to the traditional style of development and hence while applicable to package implementations as well, it does not cater to the unique characteristics of the package implementation and customization. The present invention addresses the problem by considering the various characteristics of the package implementation and customization.

Figure 1:
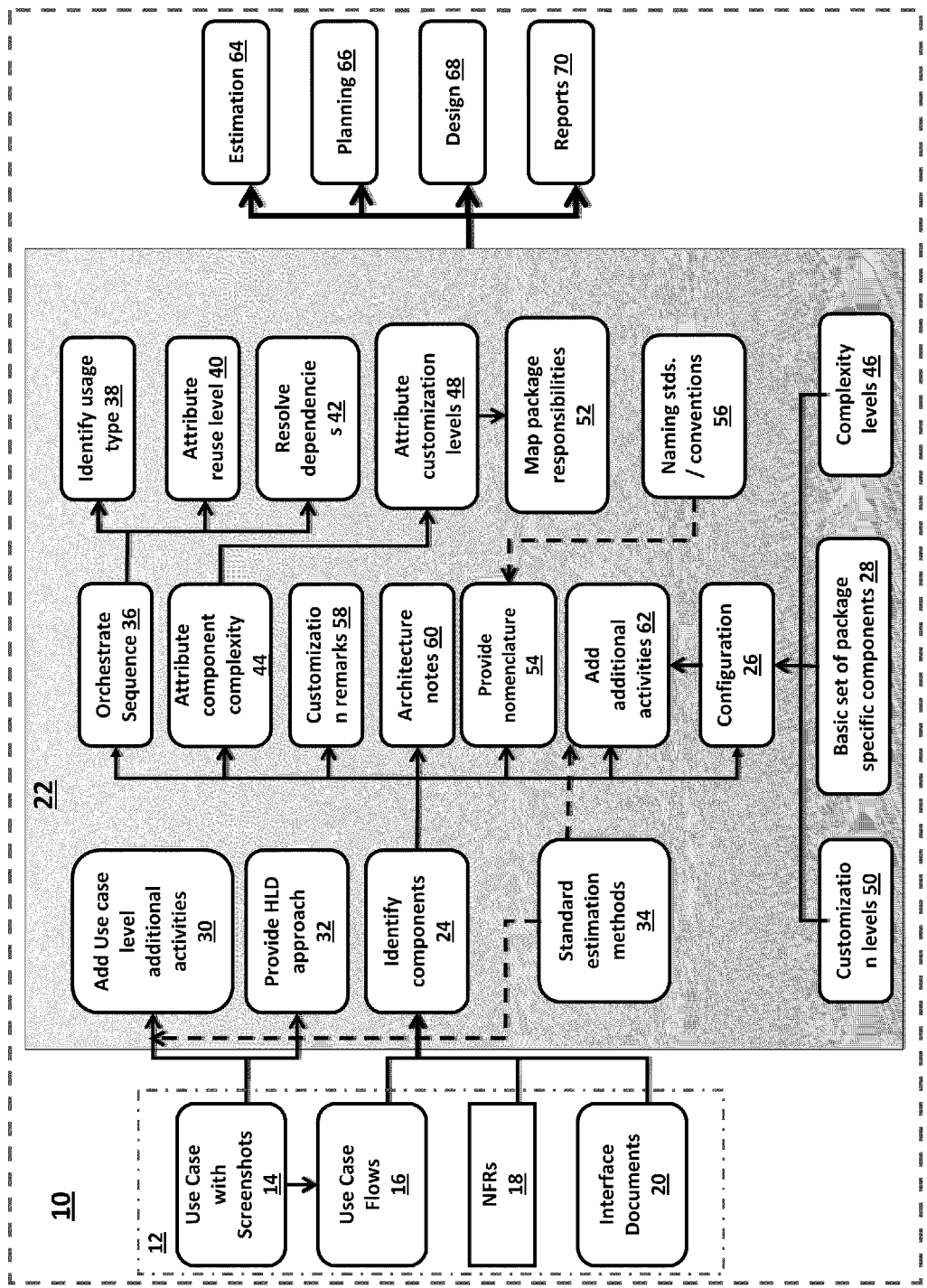
FIG. 1 is a schematic representation illustrating a method for effort estimation, design and planning of the software project, in one embodiment of the present technique.

Referring now to FIG. 1, the framework 10 to perform the process of estimating effort for a package customization, performing gap analysis to act as a precursor to detailed design and a method of enhancing the efficiency of project planning in package based software project is disclosed. The package based software project covers the package implementation or enhancements to post package implementations. The enhancement to post package implementations describes subsequent change in functionalities or additional functionalities added to the implementation based on client requirements. The method starts at block 12 which involves gathering the requirements of the package based software project. The requirements must be actionable, measurable, testable, related to identified business needs or opportunities, and defined to a level of detail sufficient for system design. The requirements of the package based software project are captured by using use cases or equivalent requirements documents with screen shots as depicted in block 14. The use cases capture the modularized functional requirements of the software project.

The method further comprises deriving the use-case flows from the use case with business rules and screenshots as depicted in block 14 and 16. It also involves capturing Non functional requirements (hereinafter termed as NFRs) and interface requirements from interface documents as depicted in blocks 18 and 20 respectively. The use case flow, as shown in 16, is the main and the alternate activity flows in a use case that gives the sequence of execution of the use case. The NFRs, as shown in block 18 specify criteria that can be used to judge the operation of a system, rather than specific functional behaviors. Non-functional requirements can be divided into two main categories.

Execution qualities, such as security and usability, are observable at run time.

Evolution qualities, such as extensibility and scalability, embody in the static structure of the software project system.

To exemplify loading terms, pagination can be classified as NFRs. Interface documents, as shown in block 18, explain and define interaction and communication protocol to external systems.

The method of effort estimation starts with framework 22 as detailed below. The effort estimation starts with the estimator identifying atomic units from the use case flows. For example, multiple steps that indicate addition of a data element to database can be considered as an atomic unit. Similarly, Edit and Delete can be other atomic units. The method starts with identifying one or more components as depicted in block 24 by referring to a configuration table as depicted in block 26, to realize the execution of use case flows or NFRs or interface documents. In one exemplary embodiment of the present invention, the components are selected, but not limited, from the group of URLs, controller commands, task commands, Data Beans, Access Beans, and JSPs. The configuration table having the components (block 28) has shown below:

TABLE 1

| Component | Acronym Used |
|---|---|
| Uniform Resource Locator | URL |
| Java Server Pages | JSP |
| Controller Commands + ACL | CtrCmd + ACL |
| Task Commands + ACL | TskCmd + ACL |
| Session Bean + JDBCHelper + SQL Queries | SessBeanJDBCHelper |
| Access Bean + Entity Bean + Databean | AccEnDataBean |
| Configuration | Config |
| Database changes | DBChanges |
| Interface Integration | IfaceIntg |
| Plain Old Java Object | POJO |
| Presentation Bean | PrezBean |
| Web Services Integration | WSIntg |
| Messaging Service Based Integration | MsgServIntg |
| Direct API Integration | DirAPIIntg |

In an alternative embodiment, as will be appreciated by those skilled in the art, the above components are identified for a use case that is executed on the Websphere Commerce Server (hereinafter called as 'WCS') package implementation platform. However, executing the use cases in a different package implementation platform, such as ATG commerce, will result in identifying a new list of components in realizing the execution of such use cases. Thus, the present invention is not limited to any specific package implementation platform.

The method also includes capturing the business rules mentioned in the use case flow document as shown in block 14. Business rules are the rules that need to be executed as part of the use-case flow and are related to the business domain in which the project is being executed.

At block 30, additional specific activities at the use case level are identified. In one exemplary embodiment of the present technique, the additional specific activities at the use case level are selected from a group, but not limited, of configuration setup for external systems, specific user training, documentation. The method further includes identifying the additional specific activities at the project level (not shown for clarity). In one exemplary embodiment of the present invention, the additional specific activities at the project level are selected from a group, but not limited, of Data conversion scripts, Admin configuration, Mail Server configuration, Performance Test Strategy & Plan, Performance Test environment setup, Performance Test execution and results, Documentation, User Training. The effort estimation for these additional specific activities is performed by using known standard estimation methodologies as depicted in block 34. At block 32, a high level design (HLD) approach is provided after having identified the components, to provide an input to the detailed design effort at later stages.

Post identifying the one or more components as shown in block 24, the components are sequenced to realize the execution of use case flow (block 36). In certain embodiment of the present technique, the sequencing of the identified components is done by numbering the components. For example, if the use case development starts with a JSP component wherein the JSP component invoking a URL which is mapped to a Controller Command, which in turn invokes 2-3 task commands, each task command using 1-2 Access/Data beans, then the components are sequenced in the following manner:

JSP-1
ContrCmd_1-1.1
TaskCmd_1-1.1.1
TaskCmd_2-1.1.2
ContrCmd_2-1.2
TaskCmd_1-1.2.1
Databean_1-1.2.2
Databean_2-1.2.3
JSP-2
ContrCmd_1-2.1
TaskCmd_1-2.1.1

After orchestrating the identified components, the usage type of the identified components has been performed (block 38). Here, the identified components are classified into any of the 4 types of usage namely, Build Afresh, Customize, Out of Box (OOB), and Duplicate. In an exemplary embodiment of the present invention, the criteria for classifying a given component of the use case is elucidated in the table 2 shown below:

TABLE 2

| Usage Type | Description |
|---|---|
| Build Afresh | If the component has to be developed from scratch |
| Out of Box (OOB) | If the component is provided Out-of-the-Box by the package, used as-is and no customization is required. |
| Customize | If the component is available in the package but has to be extended/customized for the required functionality. |
| Duplicate | In case the component has already been elaborated once in this use case, then a repeat usage is duplicate. |

For example, if the component is not available in the package implementation platform, referring to the above table, it is suggested that the component is classified under 'Build Afresh' as it requires to be developed from scratch. Alternatively, if the component is available in the package but requires changes to implement it, then the usage type for that component would be 'Customize'. If the component is available directly in the package, then the usage type for that component would be 'Out of Box (OOB)'. If the component is already developed in the same use case, then the usage type of the component is "Duplicate".

At block 40, the re use level of the identified components is evaluated. Post identifying the components required for realizing the use case, the developer has to refer to the list of components developed in the previous use cases and make out the components that can be reused for the current use case. Also, the reuse percentage of such components needs to assessed. For example, if the developer is using the component used in some past use case, it depends on the developer of how much actually he is reusing the component measured in the range of 0 (no 're use' of the component)—100% (re using the developed component completely).

The use cases also need to be evaluated in terms of their dependency on any past use case, it needs to resolve in order to establish the right flow and enable reuse (block 42). For example, a Display shopping cart use case has an included use case—Display Cross-sells. This, results in identifying components multiple times if care is not taken to resolve the dependency and mention that "Display Cross-sells" use case components can be re-used in "Display Shopping Cart" use case.

At block 44, the complexity of the identified components is attributed by classifying the component complexity ranging from Very Simple to Very Complex. The complexity of the component is selected from a group of Very Simple, Simple, Medium, Complex and Very Complex. The developer has to refer to predefined unit effort guidelines table (block 46) which provides the guidelines in awarding the complexity level for each component. In one exemplary embodiment of the present invention, the predefined unit effort guidelines table resembles the following Table 4.

TABLE 4

| Component | Guidelines | Complexity |
|---|---|---|
| JSP | JSP displays information only. No data feed from end user. No/less javascript, minimal usage of taglibs | Very Simple |
|  | Display only data from 1/2 databeans, 2/3 controls (text fields, dropdowns etc), 1/2 transactional controls, no/less javascript functions, single jsp fragment/combination of 1/2 fragments, minimal usage of taglibs | Simple |
|  | Display information data, 4/5 controls, 3/4 transactional controls, 5/6 javascript functions, combination of 2/3 fragments, 2/3 databeans required for information display, usage of multiple tag libs, no pagination requirements of record sets | Medium |
|  | Display info data, 5/10 controls, 5/8 transactional controls, 6/15 javascript functions, combination of 3/6 fragments, usage of 4/6 databeans, usage of multiple taglibs, requires usage of i18n taglibs, complex iteration on records, pagination of records | Complex |
|  | >5/10 controls, large/complex set of transactional controls, >6-15 javascript functions, >3/6 fragments, usage of >4/6 databeans, integration with Rich User Interface applications like Scene 7, flex/flash based presentation | Very Complex |

Referring to the above table 4, the developer, after identifying the component, based on the requirement in the use case flow, refers to the guidelines provided against that particular component in the guidelines table and assesses the complexity level.

For e.g., let's assume a scenario in which a JSP component is to be developed from scratch (in this case, the usage type is termed as "Build Afresh" as shown in block 38). This building a JSP component itself requires performing many sub activities as shown in the table 5 below.

TABLE 5

| JSP |
|---|
| Build |
| Replacing html tags with Struts/JSTL tags |
| Breakup of JSP to JSPF fragments |
| Develop Javascript required for the JSP |
| Backend Integration elements like form actions/hidden inputs etc |
| Integrate different JSP/JSPFs required |
| Struts configuration changes |
| Access control definition |
| Inclusion of error handling |
| Inclusion of error/text messages in properties |

There are some other sub activities requiring effort to complete the component building such as Unit testing, Code review, Integration test with backend, incorporate review comments. The effort for these activities is calculated as a percentage indicative of the effort required to build the component. In one exemplary embodiment, the effort estimation table for a JSP component for a 'build afresh' type, attributed with 'Very Simple' complexity is explained in the Table 6 shown below:

| Activities | | VS | | |
|---|---|---|---|---|
| Effort range | % | Mn | Pr | Mx |
| JSP | | 8.5 | 10.8 | 13.1 |
| Build | | 6.0 | 7.60 | 9.2 |
| Replacing html tags with Struts/JSTL tags | | 1.5 | 2.00 | 2.5 |
| Breakup of JSP to JSPF fragments | | 0.2 | 0.25 | 0.3 |
| Develop Javascript required for the JSP | | 1.2 | 1.60 | 2.0 |

-continued

| Activities | | VS | | |
|---|---|---|---|---|
| Effort range | % | Mn | Pr | Mx |
| Backend Integration elements like form actions/hidden inputs etc | | 0.8 | 1.00 | 1.2 |
| Integrate different JSP/JSPFs required | | 0.2 | 0.35 | 0.5 |
| Struts configuration changes | | 0.4 | 0.50 | 0.6 |
| Access control definition | | 0.5 | 0.50 | 0.5 |
| Inclusion of error handling | | 0.8 | 0.90 | 1.0 |
| Inclusion of error/text messages in properties | | 0.4 | 0.50 | 0.6 |
| Unit Testing | 30% | 1.8 | 2.28 | 2.8 |
| Code review | 8% | 0.5 | 0.61 | 0.7 |
| Integration test with backend | 2% | 0.1 | 0.15 | 0.2 |
| Incorporate review comments | 2% | 0.1 | 0.15 | 0.2 |

Referring to above table 6, if the JSP component is a 'Build Afresh component' with 'Very Simple' complexity level, then the minimum, probable, and maximum man hours required to build the JSP component is 8.5 hours, 10.8 hours, and 13.1 hours respectively.

Alternatively, if the JSP component is classified under 'customize' or 'OOB' usage type, then the man hours required to build the JSP component under 'customize' or 'OOB' usage type are percentages indicative of the man hours required to build the JSP component under 'Build Afresh' category as shown in the following table 7.

TABLE 7

| Complexity Level → | Build Afresh VS | | | Customize (98%) VS | | | Out of Box (OOB) (1%) VS | | |
|---|---|---|---|---|---|---|---|---|---|
| Activities | Effort range → | Mn | Pr | Mx | Mn | Pr | Mx | Mn | Pr | Mx |
| JSP | | 8.5 | 11 | 13 | 8.33 | 10.6 | 12.8 | 0.1 | 0.1 | 0.1 |

Mn: Minimum time required for the resource;
Pr: Probable time required for the resource;
Mx: Maximum time required for the resource.

As will be appreciated by those skilled in the art, the above component (JSP) is type considered for illustrating the present technique. The method will be repeated for every other identified component in order to complete estimation procedure for the use case flow.

The components, identified for realizing the use case flow, classified as 'customization' under the 'usage type' are provided with customization level as shown in block 48. Here, the developer will refer to the customization levels guidelines table (block 50) and will generate the customization level for each component classified as under 'customization' under the 'usage type' based on their complexity levels. The customization level guidelines table, in an exemplary embodiment for a JSP component type is elucidated in the table 8 below:

Illustrating the above Scenario:
Post identifying the components, the developer needs to map the components to primary package modules that initiates/executes the same. The primary package execution modules are selected from a list of, but not limited to, AFLMAR, CONDEL, CONMGT, CRMSYS, ECOMM, EMLMAR, ESBUS, FULFIL, MSGSER, ORDMGT, PAYGWY, PROCON, RICHMED, SERENG, SITESER, WEBANAL, WEBPERF or combinations thereof. For ex. JSP is chosen from the ECOMM package module. Suppose, if this ECOMM package module requires some integration, then the ECOMM package module is integrated with additional package module selected from the group, but not limited to, AFLMAR, CONDEL, CONMGT, CRMSYS, ECOMM, EMLMAR,

TABLE 8

| | | Customization level | | |
|---|---|---|---|---|
| Component | Complexity | Low | Medium | High |
| JSP | Very Simple | Changes to labels; changes to links | changes to data displayed, changes to javascript validation; | Complete overhual of the table structure, complex, additional tables; needs changes to/replacement of components already used; introduce heavy usage of taglibs; |
| | Simple | Changes to labels; changes to links; changes to javascript used; modification of controls | minimal navigational structure changes; introduction of new javascripts/transactional controls; increased usage of taglibs; | overhaul of navigational structure; increased usage/replacement of databeans; break up/collapse of fragments; modifications to the taglibs used |
| | Medium | same as above (each parameter gets affected with increase/decrease in number of components; increase in # of modifications of components) | same as above (each parameter gets affected with increase/decrease in number of components; increase in # of modifications of components) | same as above (each parameter gets affected with increase/decrease in number of components; increase in # of modifications of components) |
| | Complex | same as above (each parameter gets affected with increase/decrease in number of components; increase in # of modifications of components) | same as above (each parameter gets affected with increase/decrease in number of components; increase in # of modifications of components) | same as above (each parameter gets affected with increase/decrease in number of components; increase in # of modifications of components) |

As will be appreciated by those skilled in the art, the above component (JSP) type is considered for illustrating the present technique of defining the customization levels for each identified component. The present invention should not be limited in light of the above exemplary description.

The method further includes the step of mapping the identified components to package modules (block 52). The identified components are mapped to a primary package module that aid in executing the components. In the process, the component may require integration of additional package module with primary package module.

ESBUS, FULFIL, MSGSER, ORDMGT, PAYGWY, PROCON, RICHMED, SERENG, SITESER, WEBANAL, WEBPERF.

As will be appreciated by those skilled in the art, the above package modules are identified for the Websphere Commerce Server (hereinafter called as 'WCS') package implementation platform. However, if a different package implementation platform such as ATG commerce is used, it will result in identifying a new list of package modules specific to the package. Thus, the present invention is not limited to any specific package implementation platform.

The identified components for realizing the use case flow are provided with nomenclature (block 54). The nomenclature has been provided based on the naming standards and conventions (referring to block 56). In one exemplary embodiment, the naming convention should be in aligning with JAVA naming conventions. Illustrating the above scenario, the components identified on WCS package implementation platform are provided with the nomenclature detailed in the below table 9.

TABLE 9

| Component | Nomenclature |
| --- | --- |
| JSP | showCardsInWallet.jsp |
| AccEnDataBean | com.ibm.commerce.order.beans.OrderDataBean |

At block 58, the customization or implementation remarks for at least one of the identified components are provided. At this stage, the developer will have to explain customization/implementation details for each component and how it will be carried out, what functionality will be handled etc. illustrating this scenario:

| Component | Customization/Implementation Remarks |
| --- | --- |
| JSP | JSP page uses OrderDataBean and gets a order for that user which has the status 'Q' and gets all Payment methods associated with this order<br>Use JSTL tags to iterate over the OrderDataBean to get the list of credit cards |
| CtrCmd + ACL | WalletAddCmd uses com.ibm.commerce.order.OrderProfile to create an empty order with status 'Q',<br>com.ibm.commerce.order.SetOrderOrganizationCmd to set the previously create order's organization hierarchy and<br>com.ibm.commerce.order.StoreAndValidatePaymentCmd to create an EDPOrder associated to the order created.<br>WalletAddCmd invokes com.infosys.mcc.cmd.PIAddCmdImpl to ensure addition. Override only PIAddCmd's validateOrderStatus method, which invokes the ValidateOrderStatus task command to over-ride the default order status check, so that the order status 'Q' doesn't prevent the addition of PI. The PIAddCmdImpl uses super.execute to add the credit card information to PPCPAYINST table. |
| TskCmd + ACL | Create a new task command that uses OrderAccessBean to retrive the order status and excludes orders with status Q along with orders with status P, E, NEW, M |

At block 60, critical architecturally significant details about the components are mentioned. Significant architectural notes to be kept in mind while designing and developing the use case are mentioned. In an exemplary embodiment of the present technique, if a component needs to lookup a web service for Single-SignOn (SSO) functionality, the SSO web service invocation is an architecturally significant element which can be abstracted across multiple use cases. Hence, this needs to be highlighted under the category of 'architectural note'.

The developer has to identify additional specific activities required at the component level as shown in block 62. For example, the additional specific activities required at the component level include, but not limited to, conversion of client provided HTML to JSP. While not inherent to the package customization, these are additional requirements that need to be met. The effort estimation for these additional specific activities identified at the component level is performed by using known standard estimation methodologies as depicted in block 28.

The overall effort estimation for a software project based on project implementation (block 64) is as follows:

For each use case in scope add
    Component development effort (code, review, unit test and rework)
    Any additional effort for a component e.g. building an HTML for a JSP component (the cookbook assumes we need to build a JSP component over a client provided HTML)
    Additional effort at a use case level e.g. building an interface to address verification system.
Calculated effort for additional activities (e.g. data conversion) at the project level is added to the total effort estimation.

Effort for program management, project management, and configuration management is calculated as % of total and added to arrive at a total effort required for executing the package based software implementation.

Precursor to Design: The methodology considers the special characteristics of package customization (e.g. identifying the usage type of the component in terms of Build Afresh, Out of Box, Customization) and also accounts for re use of already developed components in past use cases. The methodology starts with use case flows and goes to the granular level of the components of the package implementation resulting in a precursor to the detailed design as depicted in block 68.

In another embodiment of the present invention, the method to perform gap analysis after gathering requirements of a software project to act as a precursor for a detailed design is disclosed. The method includes the steps of identifying the components that realize the execution of use case flows, NFRs, interface documents. The granular componentization at the use case level along with the consideration of the complexity levels, customization levels, architecture notes, customization remarks results acts as a precursor to the detailed design. Thereby, a developer implementing the use case is provided with the type of components to be used along with the level of customization needed. The process thus ensures consistent design during the implementation.

The present invention also helps in project management activity. Having identified the type of components and the estimated time for its implementation the project can be planned better. Similar components can be grouped together to be implemented by a single resource and thereby leverage synergy, alternatively estimated time can be used to group the components so that a balance allotment of work can be done.

The present invention further helps planning with details like component effort details, engagement applicability, re use percentage of the components in the form of reports (block 70).

Figure 2:
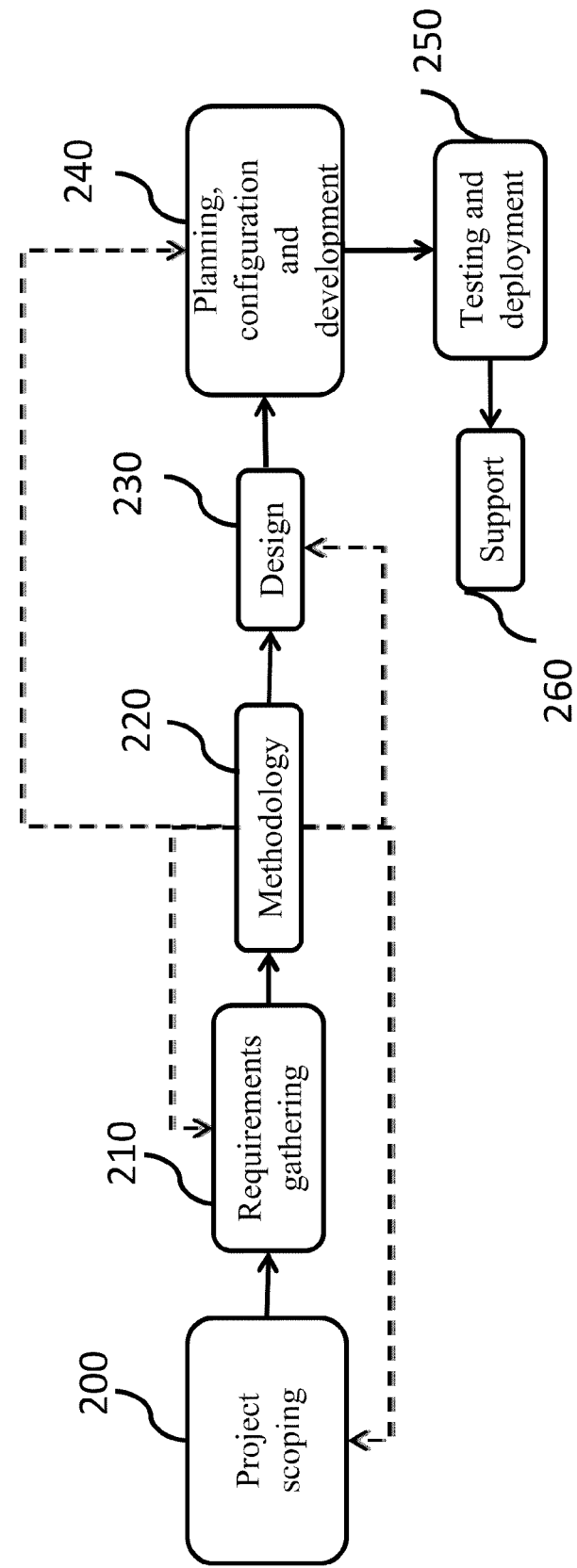
FIG. 2 is a schematic representation illustrating the software development life cycle (SDLC) of a software project with the implementation of the present invention, in one embodiment of the present technique.

FIG. 2 depicts the software development life cycle (SDLC) in a package based software project by making the implementation of the above explained methodology as a mandatory activity after gathering requirements and before proceeding to design. The SDLC starts with defining the project scoping (block 200), gathering the requirements in the form of use cases with screen shots and generating the use case flows, Non functional requirements (NFRs), interface documents (block 210). Using these use case flows, executing the methodology explained above to derive the effort estimation by considering the component types realizing the use case flows, their complexity levels, customization levels etc. (block 220). The methodology explained above is a mandatory activity post gathering requirements and before detailed design. The effort estimation methodology provides a linkage between requirements, use cases, design and code artifacts by the use case flows and components by establish a direct correlation with use case flows and components that are involved in realizing the flows (block 210, block 220, block 230, block 240).

Testing software is an integral and important part of the software development process. This part of the process ensures that bugs are recognized as early as possible. Deployment of the software is done after the code is appropriately tested. Once it is approved for release and sold or otherwise distributed into a production environment (block 250). Maintaining and enhancing software to cope with newly discovered problems or new requirements can take far more time than the initial development of the software. It may be necessary to add code that does not fit the original design to correct an unforeseen problem or it may be that a customer is requesting more functionality and code can be added to accommodate their requests (block 260).

The identification of the components from usecases before the detailed design helps in maximizing the re-use whereas, the earlier methodologies relied on a reconciliation of the components identified across modules.

The methodology also acts as a supplement in the project planning by providing insight into the effort required as well as complexity levels of the identified components. The methodology also helps in utilization of past experimental data (i.e. already developed use cases) and hence brings the concept of reusability unlike in the standard estimation methodologies.

Exemplary Computing Environment

Figure 3:
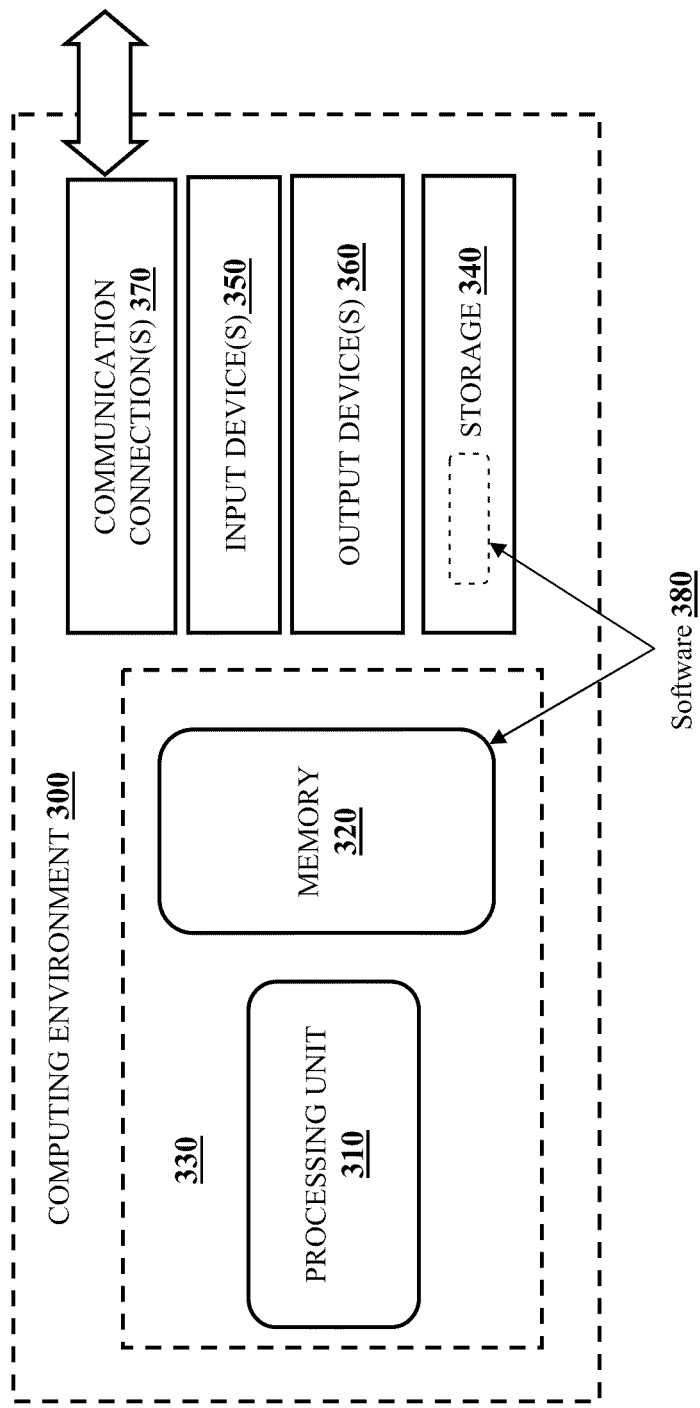
FIG. 3 is a system illustrating a generalized computer network arrangement, in one embodiment of the present technique.

One or more of the above-described techniques may be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which may be used to store information and which may be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A computer implemented method for effort estimation of a package based software project, comprising the steps of:
  identifying, a microprocessor, one or more components from a configuration table to implement at least one of a use case flow or a non functional requirement (NFR) or an interface document or combinations thereof derived using an use case of the software project;
  sequencing, using the microprocessor, the identified one or more components to prioritize execution of the use case of the software project, wherein sequencing the identified one or more components further comprises:
    classifying, using the microprocessor, the identified one or more components into one of categories, the categories comprising: need to develop the identified component, no customization required for the identified component, customization required for the identified component, and identified component already developed, and evaluating, using the microprocessor, reuse level of the identified one or more components, wherein the reuse level is evaluated by referring to a list of components developed in previous use cases and identify the components that can be reused for the use case of the software project; and attributing, the microprocessor, complexity of the identified one or more components to determine the effort estimation for execution of the prioritized use case by mapping the identified one or more components to a predefined unit effort guidelines table, wherein the attributing complexity includes using an unit effort table for determining the effort estimation requirement for execution of each component of the prioritized use case.

2. The computer implemented method of claim 1, wherein the package based software project includes at least one of a package implementation or enhancements to post-package implementation.

3. The computer implemented method of claim 1, wherein sequencing the identified one or more components further includes resolving dependencies.

4. The computer implemented method of claim 1, wherein the effort estimation required for one or more components classified in at least one of the categories: customization required for the identified component and no customization required for the identified component is percentage derivative of the effort estimation required for one or more components in the category need to develop the identified component.

5. The computer implemented method of claim 1, wherein the reuse level is further determined based on availability of the identified components in past use cases.

6. The computer implemented method of claim 1, wherein attributing complexity of the identified one or more components further includes providing customization levels required for each of the identified one or more components.

7. The computer implemented method of claim 1, further comprising mapping the identified one or more components to a primary execution package module that aid in executing the identified one or more components.

8. The computer implemented method of claim 1, further comprising mapping the identified one or more components to an additional package module integrated with the primary execution package module that aid in executing the identified one or more components.

9. The computer implemented method of claim 1, further comprising identifying additional specific activities required for developing one or more identified components or the use case or the software project or combinations thereof.

10. The method of claim 1, wherein identifying one or more components further comprises providing architecture notes to capture architecturally significant details about one or more identified components.

11. The computer implemented method of claim 1, includes providing nomenclature to one or more identified components.

12. The computer implemented method of claim 1, estimation effort of the package based software project further includes estimating of one or more phases of a software development life cycle (SDLC).

13. A computer implemented method to perform the gap analysis after gathering requirements of a package based software project to act as a precursor for a detailed design comprising the steps of:

a. identifying, a microprocessor, one or more components from a configuration table to implement at least one of a use case flow or a non functional requirement (NFR) or an interface document or combinations thereof derived using an use case of the software project;

b. sequencing, using the microprocessor, the identified one or more components to prioritize execution of the use case of the software project, wherein the sequencing the identified one or more components further comprises:

classifying, using the microprocessor, the identified one or more components into one of categories, the categories comprising: need to develop the identified component, no customization required for the identified component, customization required for the identified component, and identified component already developed, and evaluating, using the microprocessor, reuse level of the identified one or more components, wherein the reuse level is evaluated by referring to a list of components developed in previous use cases and identify the components that can be reused for the use case of the software project;

c. attributing, using the microprocessor, complexity of the identified one or more components to determine the effort estimation for execution of the prioritized use case by mapping the identified one or more components to a predefined unit effort guidelines table, wherein the attributing complexity includes using an unit effort table for determining the effort estimation requirement for execution of each component of the prioritized use case;

d. generating, using the microprocessor, at least one an implementation remark to the identified one or more components using a implementation remark guidelines table; and e. providing, sing the microprocessor, architecture notes to capture architecturally significant details from a architectural change and deviation guidelines table about the identified one or more identified components wherein at least one of the steps a) or b) or c) or d) or e) or combinations thereof acts as the precursor for the detailed design of the software project.

14. The computer implemented method of claim 13, wherein sequencing the identified one or more components further comprises resolving dependencies.

15. The computer implemented method of claim 13, wherein the effort estimation required for one or more components classified in at least one of categories: customization required for the identified component and no customization required for the identified component is percentage derivative of the effort estimation required for one or more components in the category need to develop the identified component.

16. The computer implemented method of claim 13, wherein the reuse level is further determined based on availability of the identified components in past use cases.

17. The computer implemented method of claim 13, wherein attributing complexity of the identified one or more components further includes providing customization levels required for each of the identified one or more components.

18. The computer implemented method of claim 13, further comprising identifying additional specific activities required for executing at least one of the identified one or more components or the use case or the software project or combinations thereof.

19. The computer implemented method of claim 13, wherein the identified one or more components includes providing nomenclature to at least one of the identified one or more components.

20. A computer implemented method for improving execution efficiency of a package based software project in a software development life cycle (SDLC) comprises of:

performing, a microprocessor, a gap analysis to help in improving the estimation accuracy, effective and efficient planning and better traceability between requirements, design and code components of a package based software project, wherein the methodology comprises the steps of:

identifying, the microprocessor, one or more components;

sequencing, using the microprocessor, the identified one or more components to prioritize execution of the use case, wherein sequencing the identified one or more components further comprises:

classifying, using the microprocessor, the identified one or more components into one of categories, the categories comprising: need to develop the identified component, no customization required for the identified component, customization required for the identified component, and identified component already developed, and evaluating, using the microprocessor, reuse level of the identified one or more components, wherein the reuse level is evaluated by referring to a list of components developed in previous use cases and identify the components that can be reused for the use case of the software project; and attributing, the microprocessor, complexity of the identified one or more components; attributing component types, customization levels and reuse levels based on predefined guidelines table for the identified components.

21. A computer program product comprising a non-transitory computer usable medium having a computer readable program code embodied therein for performing effort estimation of a package based software project, the method comprising:

program code adapted for identifying one or more components from a configuration table to implement at least one of a use case flow or a non functional requirement (NFR) or an interface document or combinations thereof derived using an use case of the software project;

program code adapted for sequencing the identified one or more components to prioritize execution of the use case of the software project, wherein sequencing the identified one or more components further comprises:

classifying, using the microprocessor, the identified one or more components into one of categories, the categories comprising: need to develop the identified component, no customization required for the identified component, customization required for the identified component, and identified component already developed, and evaluating, using the microprocessor, reuse level of the identified one or more components, wherein the reuse level is evaluated by referring to a list of components developed in previous use cases and identify the components that can be reused for the use case of the software project; and program code adapted for attributing complexity of the identified one or more components to determine the effort estimation for execution of the prioritized use case by mapping the identified one or more components to a predefined unit effort guidelines table, wherein the attributing complexity includes using an unit effort table for determining the effort estimation requirement for execution of each component of the prioritized use case.

* * * * *